Feb. 27, 1940.  E. E. ENGSTROM  2,191,610
CAKE PACKAGE
Filed Oct. 9, 1935
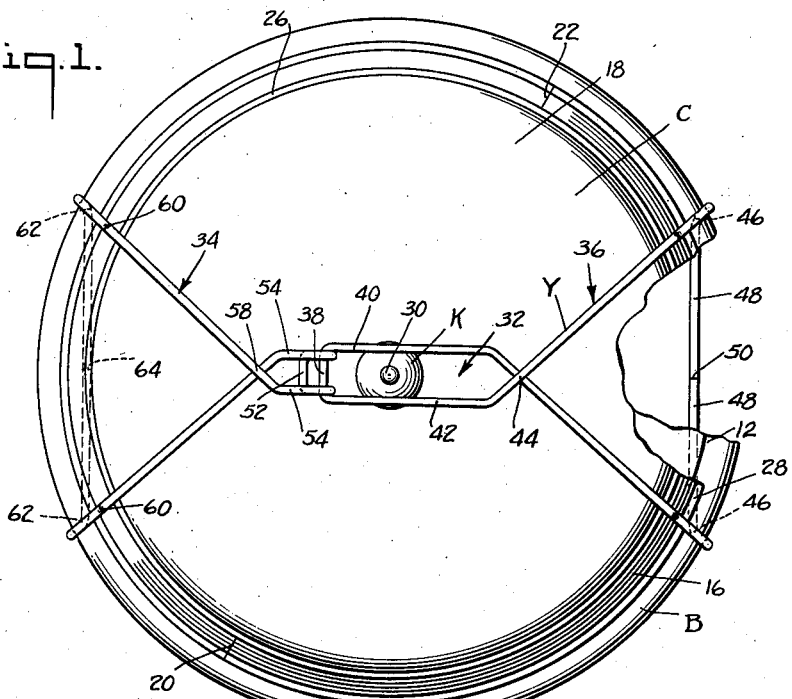
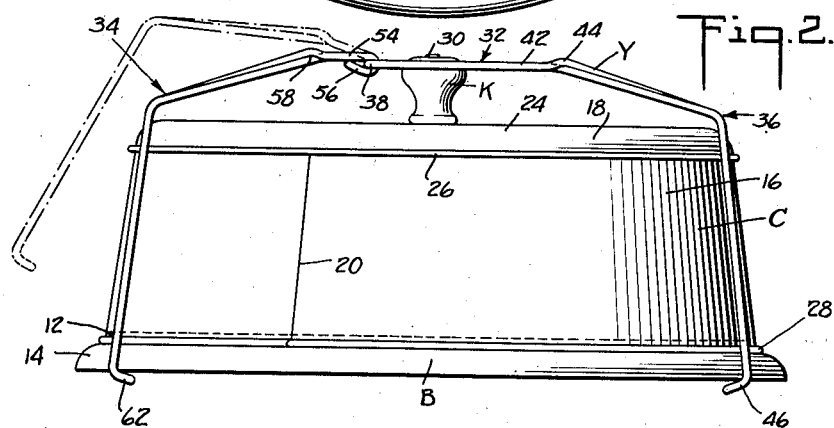
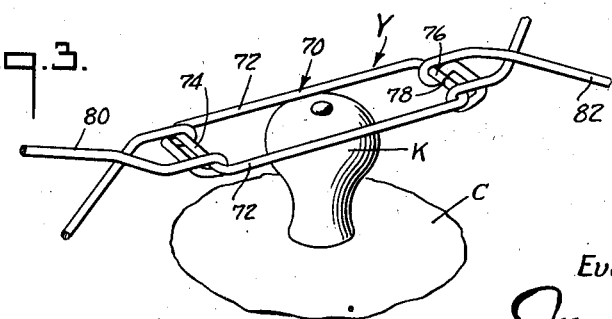
INVENTOR
Everett E. Engstrom
BY
ATTORNEYS Patented Feb. 27, 1940

2,191,610

UNITED STATES PATENT OFFICE 2,191,610

CAKE PACKAGE

Everett E. Engstrom, White Plains, N. Y., assignor to McKeesport Tin Plate Corporation Application October 9, 1935, Serial No. 44,141

6 Claims. (Cl. 220—56)

This invention relates to containers, and more particularly to a cake package provided with a detachable yoke for clamping together the cover and base of the package.

It has heretofore been suggested to provide a cake package comprising a base and cover together with a wholly removable one-piece yoke or clamp for holding the same together. Such a yoke is convenient because it may also be used as a handle for carrying the cake package. Unfortunately, the one-piece yoke, while possessing the advantage of being completely removable, is exceedingly difficult to apply to or remove from the cake package, particularly so in view of the fact that this operation is to be performed by women. Experience has shown that many housewives dispense with the yoke entirely rather than struggle with the difficult operation of springing the same on or off the package.

It is the primary object of my invention to generally improve cake packages, and a more specific object of my invention is to obviate the foregoing difficulties attendant upon the use of a yoke or handle. To this end I make the yoke out of a number of distinct pieces which are pivotally related, thus greatly facilitating the application of the yoke to or its removal from the cake package. More specifically, I make the yoke of center and end pieces and both end pieces may be hinged to the center piece, although I find it adequate and simpler to construct the arrangement with the center and one end piece formed integrally, the other end piece being pivoted on the center piece.

To the accomplishment of the foregoing and other objects which will hereinafter appear, my invention consists in the cake package elements and their relation one to the other, as are hereinafter more particularly described in the specification and sought to be defined in the claims. The specification is accompanied by a drawing in which:

Fig. 1 is a plan view of a cake package embodying features of my invention;

Fig. 2 is a side elevation of the same; and

Fig. 3 is a perspective view showing a modification.

Referring to the drawing, and more particularly to Figs. 1 and 2 thereof, the cake package comprises a base B, cover C preferably provided with a knob K, and a multiple-piece yoke Y. In the present instance the yoke is a two-piece yoke, the pieces of which are pivotally related so as to turn from the solid to the broken line position shown in Fig. 2, thereby greatly facilitating the application of the yoke to or its removal from the container.

Considering the invention in greater detail, the base B is preferably circular and as here illustrated is a solid wooden disc, the periphery of which is recessed to form a peripheral shoulder 12. The marginal portion 14 of the base projects outwardly from shoulder 12. The wooden base is substantial and attractive, and is of practical value when cutting the cake, which may be done, of course, directly on the base.

The cover C is preferably made of sheet metal. It comprises a side wall or skirt 16 and a top wall 18. For purposes of economy the side and top walls are preferably made of separate pieces of sheet metal, wall 16 being rolled to circular or frustroconical shape, and its ends joined by an upright seam 20. In some cases it is convenient to make the skirt of two pieces of sheet metal joined by end or upright seams disposed diametrically opposite one another, as indicated by the numerals 20 and 22. The top is formed from a circular disc of sheet metal which is drawn to form a shallow marginal flange 24, and the latter is connected to skirt 16 by a peripheral bead 26 which serves to strengthen and rigidify the cover and also to ornament the same. The bottom or open edge of the cover is curled to form a rounded edge 28.

The knob K acts as a convenient handle for raising the cover from the base when the yoke has been removed. It also acts as a convenient projection to receive the closing thrust of the yoke. The knob may be made of any desired material, for example wood or glass, and is secured to the cover by an appropriate bolt 30.

The yoke Y is preferably formed of relatively stiff heavy gauge wire. It is made up of a center portion 32 which bears on knob K, and end portions 34 and 36 which extend sidewardly and downwardly and thence beneath the base. In the present case the yoke is made of two pieces, one piece including the center portion 32 and the end portion 36, while the other piece consists of the end portion 34 which is pivotally connected to the center portion 32 at 38. Each piece of the yoke may be made of a single piece of wire. This piece of wire is reversely bent to form the hinge wire 38 and spaced parallel wires 40 and 42, the space between which is preferably made less than the diameter of the knob. At the end of the center portion 32 of the yoke the wires are bent toward one another and crossed at the point 44 at which point they may be and preferably are, spot-welded. The wires continue in diverging directions to a point approximately above the periphery of the base, at which they are bent downwardly to the bottom of the base, whence they are bent inwardly for a short distance to form the parts 46, whereupon they are bent transversely to form the aligned parts 48, the ends of which are brought into abutting relation at 50, whereat they are preferably secured as by spot-welding.

The end piece 34 is in some respects similar in construction, it also comprising a single piece of wire which is reversely bent to form a transverse piece 52 somewhat shorter than the hinge piece 38 and spaced parallel wires 54 which are substantially shorter than the wires 40 and 42. These parallel wires are themselves reversely bent about the hinge wire 38 to form a sturdy hinge connection 56. Parallel wires 54 are then crossed at 58 and there spot-welded. The wires diverge to the points 60 approximately above the periphery of the base, whereat they are turned downwardly to the bottom of the base and thence turned inwardly to form the parts 62. They are then bent toward one another and meet in alignment at the point 64, whereat they are preferably welded.

It will be understood that the yoke is so dimensioned that when clamped in place it exerts a closing pressure between the cover and the base which helps preserve the cake and which is itself adequate to hold the yoke on the package unless intentionally removed, as by tilting the end piece 34 outwardly to the broken line position shown in Fig. 2.

The yoke may be made of three pieces by pivotally connecting each of the end portions to the center portion. Such an arrangement is illustrated in Fig. 3, in which the top wall of cover C is provided with a knob K as heretofore described, which in turn is pressed downwardly by the center portion 70 of the yoke. In this case the center portion takes the form of a rectangular loop and is preferably made of a single piece of wire bent to form spaced parallel rails 72 and hinge connections 74 and 76. The abutting ends of the wire are spot-welded together as indicated at 78. The end pieces 80 and 82 are each formed like the end piece 34 in Figs. 1 and 2, the end piece 80 being bent about and pivotally related to the hinge wire 74, and the end piece 82 being bent about and pivotally related to the hinge wire 76. The operation of this yoke is generally similar to that heretofore described except that in releasing the yoke from the package either end piece may be moved outwardly. In one aspect it may be said that the two-piece yoke of Fig. 1 differs from the three-piece yoke of Fig. 3 in simplifying the structure by eliminating one hinge and forming one of the end portions integrally with the center portion of the yoke.

It is believed that the mode of constructing and using, as well as the many advantages of my improved cake package will be apparent from the foregoing detailed description thereof.

It will also be apparent that while I have shown and described my invention in preferred forms, many changes and modifications may be made in the structures disclosed without departing from the spirit of the invention defined in the following claims.

I claim:

1. A two-piece yoke intended for use with a cake package comprising a base and an inverted dished cover, one piece of said yoke comprising stiff wire reversely bent on itself to form parallel parts at the center of the yoke, and thence bent downwardly and thence bent inwardly, the second piece of said yoke comprising stiff wire reversely bent on itself to form parallel parts, the reversely bent part of one piece being reversely bent about the reversely bent part of the other piece to form a pivotal connection therewith, the ends of the second piece being bent downwardly and thence bent inwardly, said yoke being detachably mountable on said package to hold the cover tightly closed against the base.

2. A two-piece yoke intended for use with a cake package comprising a base and an inverted dished cover with a top knob, one piece of said yoke comprising stiff wire reversely bent on itself to form parallel parts at the center of the yoke, and thence crossed and thence bent downwardly and thence bent inwardly and thence bent transversely toward one another and joined, the second piece of said yoke comprising stiff wire reversely bent on itself to form parallel parts which are themselves reversely bent about the reversely bent end of the first piece to form a pivotal connection therewith, the ends of the second piece then being crossed and thence bent downwardly and thence bent inwardly and thence bent transversely toward one another and joined, said yoke being detachably mountable on said package over the knob and beneath the base in order to hold the cover tightly closed against the base.

3. A three-piece yoke intended for use with a cake package comprising a base and an inverted dished cover, said yoke comprising center and side pieces, the center piece being made of stiff wire reversely bent on itself to form parallel parts and relatively short transverse connections, the side pieces of said yoke each comprising stiff wire reversely bent on itself to form parallel parts, center and side pieces being disposed end to end with the reversely bent end of one of said pieces being reversely bent about the adjacent reversely bent end of the other of said pieces to form pivotal connections therebetween, the ends of the side piece wire then being bent downwardly and thence bent inwardly, said yoke being adapted to be detachably mountable on said package in order to hold the cover tightly closed against the base.

4. A three-piece yoke intended for use with a cake package comprising a base and an inverted dished cover with a top knob, said yoke comprising center and side pieces, the center piece being made of stiff wire reversely bent on itself to form parallel parts and relatively short transverse connections, the side pieces of said yoke each comprising stiff wire reversely bent on itself to form parallel parts which are themselves reversely bent about the transverse connections of the center piece to form pivotal connections therewith, the ends of the side piece wire then being crossed and thence bent downwardly and thence bent inwardly and thence bent transversely toward one another and joined, said yoke being adapted to be detachably mountable on said package over the knob and beneath the base in order to hold the cover tightly closed against the base.

5. A yoke intended for use with a cake package comprising a base and an inverted dished cover, said yoke being made of a plurality of pieces of stiff wire, one piece of said yoke being reversedly bent on itself to form parallel parts at the center of the yoke, another piece of said yoke being reversely bent on itself to form parallel parts, the reversely bent part of one of said pieces being reversely bent about the reversely bent part of the other piece to form a pivotal connection therewith, the ends of said second piece being bent downwardly and thence bent inwardly, said yoke being detachably mountable on said package to hold the cover tightly closed against the base.

6. A yoke intended for use with a cake package comprising a base and an inverted dished cover with a top knob, said yoke comprising a plurality of pieces of stiff wire, one of said pieces being reversely bent on itself to form parallel parts, another piece of said yoke being reversely bent on itself to form parallel parts which are themselves reversely bent about the reversely bent end of the first piece to form a pivotal connection therewith, the ends of the second piece then being crossed and thence bent downwardly, and thence bent inwardly, and thence bent transversely toward one another and joined, said yoke being detachably mountable on said package over the knob and beneath the base in order to hold the cover tightly closed against the base.

EVERETT E. ENGSTROM.